Sept. 15, 1959  F. RUFER  2,903,918
APPARATUS FOR RENDERING AUTOMATIC THE CONTROL OF A MACHINE TOOL
Filed Nov. 15, 1957  4 Sheets-Sheet 1
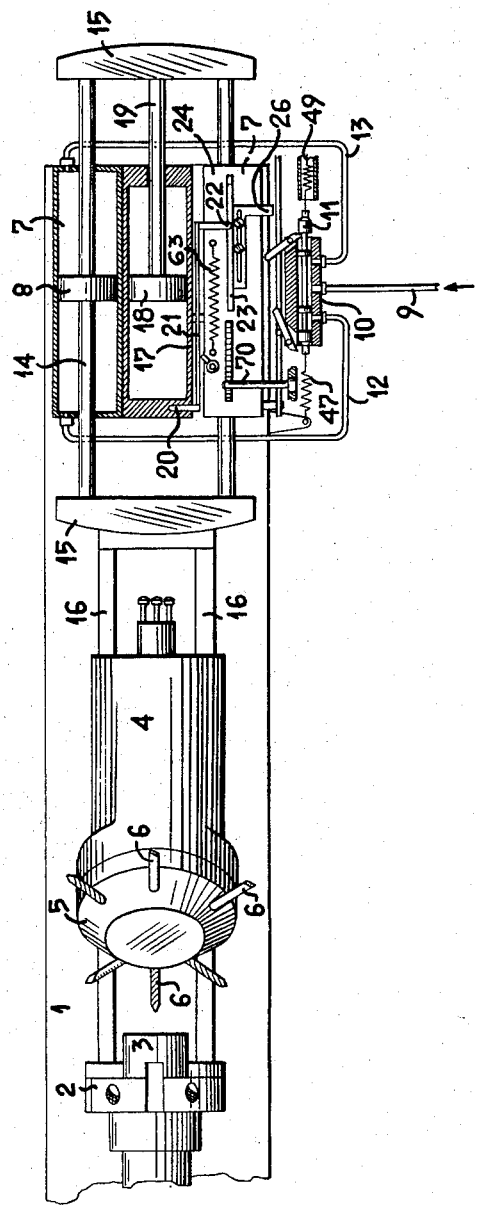
INVENTOR
FRANZ RUFER
BY Emory L. Groff
Atty

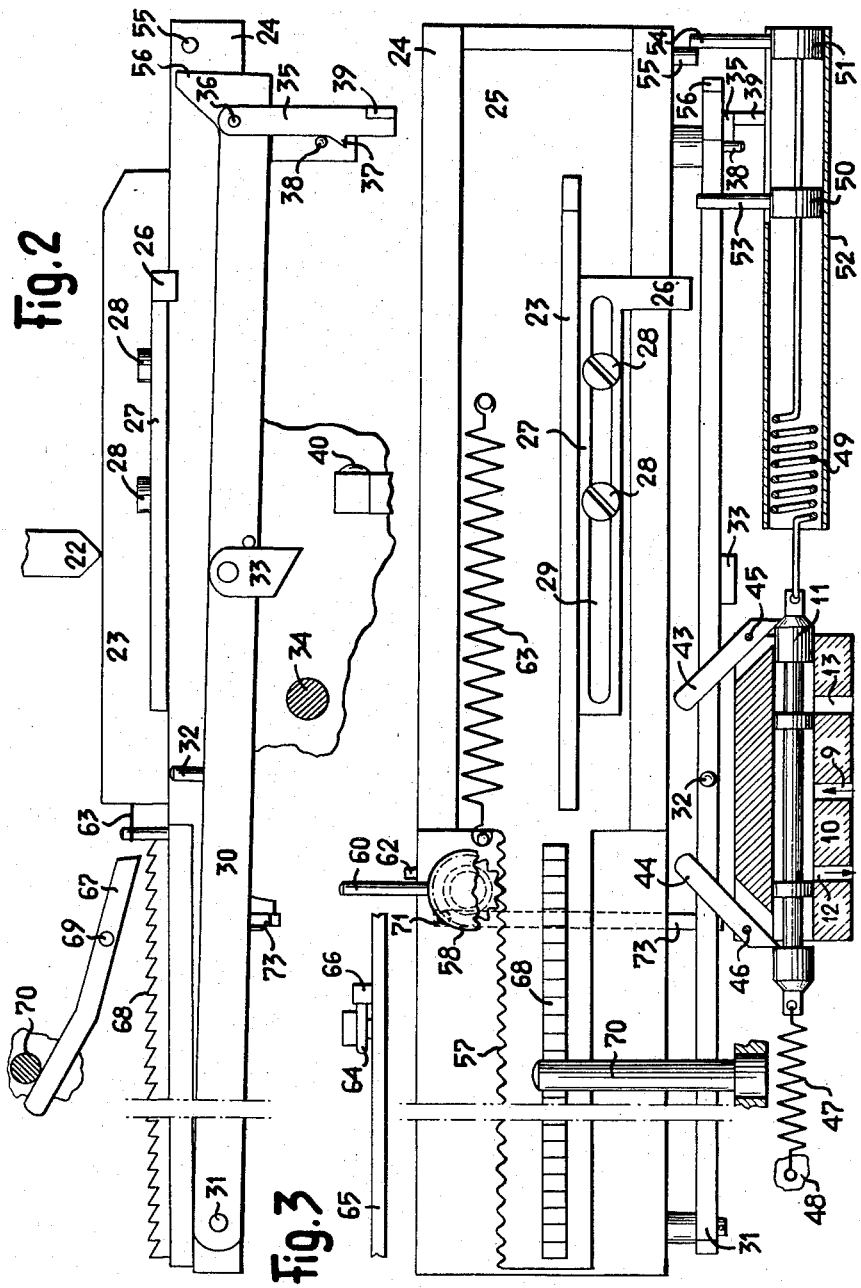

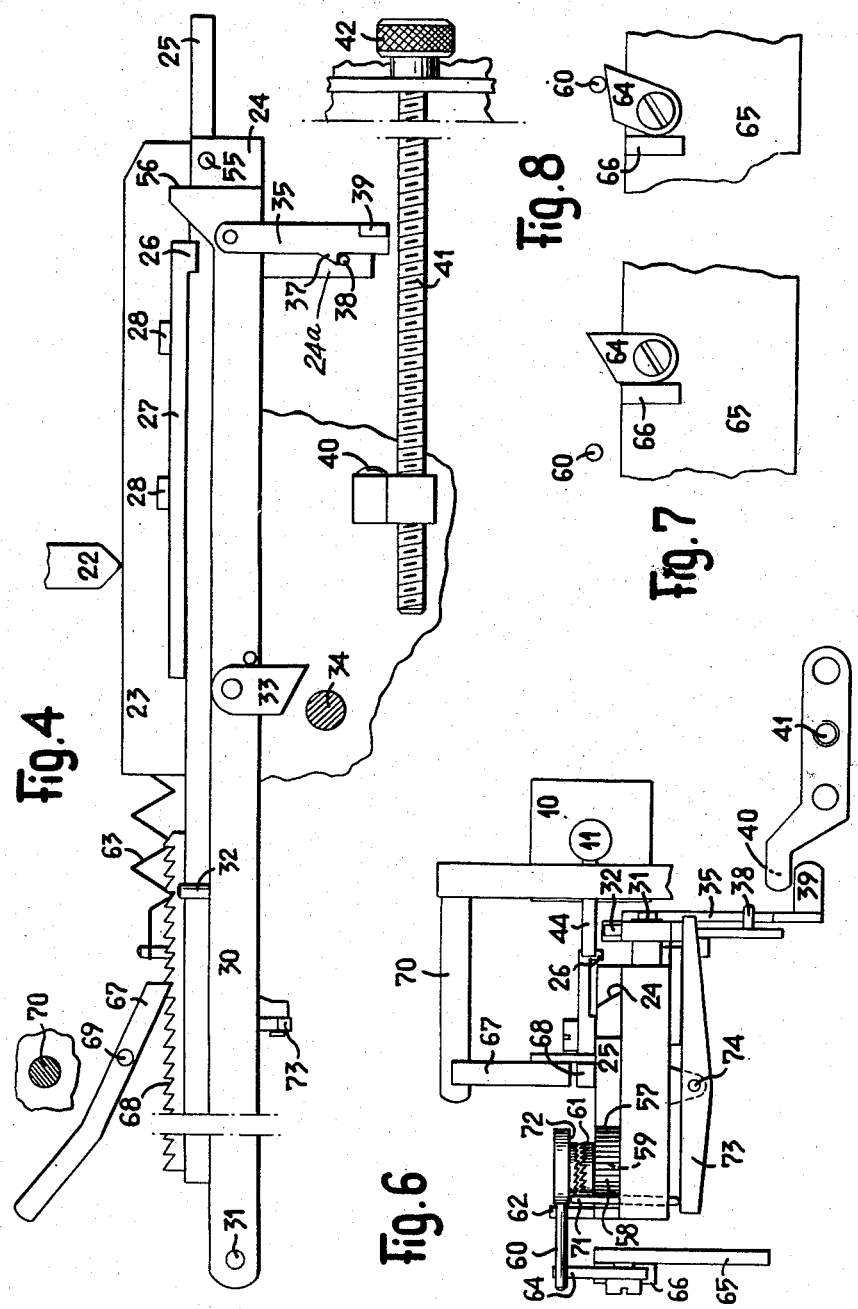

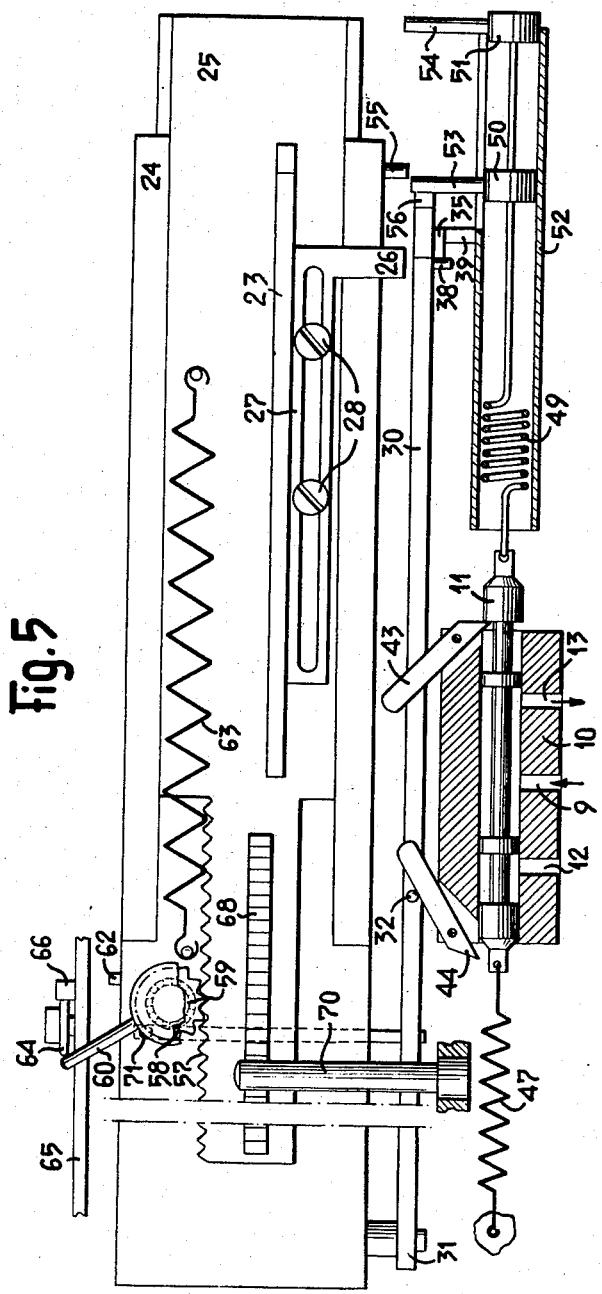

United States Patent Office 2,903,918
Patented Sept. 15, 1959

2,903,918

APPARATUS FOR RENDERING AUTOMATIC THE CONTROL OF A MACHINE TOOL

Franz Rufer, Geneva, Switzerland, assignor to Mefina S.A., Fribourg, Switzerland, a corporation of Switzerland Application November 15, 1957, Serial No. 696,725

Claims priority, application Switzerland December 18, 1956

8 Claims. (Cl. 77—32.3)

The present invention has for its object an apparatus in the form of an attachment for a machine tool, such for example, a drill which is advanced toward and withdrawn from the work during the drilling operation periodically to remove shavings or like debris.

In a machine tool to which the present attachment is applied, the to-and-fro movements of the tool relative to the work are controlled by a servo-motor. This motor defines the limit of the operative drilling stroke, the drill being progressively advanced at each intermediate phase of operation and the movement for the reversal of the operation of said servo-motor is actuated by two stops, the first stop reversing the forward movement into rearward movement and the second stop effecting inverse reversal. While apparatus of this type is generally known, nevertheless, in general, the reversals are effected by electrical contacts controlling either relays or electromagnetic control valves. However, this type of apparatus is delicate and unreliable in operation because the contacts can be readily fouled and cause faulty operation of the machine.

The apparatus according to the present invention is of a purely mechanical type which is characterised in that it comprises a mechanism capable of producing a predetermined movement of the first stop during each to-and-fro movement of the tool, in such a manner as to progressively displace the feed limit of the tool relatively to the part which is being operated upon.

One form of construction of the apparatus according to the invention is shown diagrammatically and by way of example in the accompanying drawings, wherein:

Fig. 1 is a plan view of the apparatus in its application to a turret-lathe.

Fig. 2 is a view in side elevation of a part of the apparatus,

Fig. 3 being a plan view of said same part of the apparatus in the same position of operation corresponding to the position of rest.

Figs. 4 and 5 are views similar to Figs. 2 and 3 at another moment of operation of the apparatus.

Fig. 6 is an end view of the part of the apparatus shown in Figs. 2 to 5.

Figs. 7 and 8 show a detail of the apparatus in two different phases of operation.

In the example shown in Fig. 1, the attachment is assumed to be mounted on a turret-lathe for rendering its various phases of operation automatic and, particularly for making automatic the various successive different phases of advance and return which it is necessary to effect during the course of a single drilling operation so as to allow of the removal of the shavings cut in the part being machined by the bit. This turret-lathe 1 comprises a head 2 carrying the part 3 to be machined. The carriage 4 of this lathe carries a rotary turret 5 having the various operating drills 6 and, amongst them, especially one or more bits.

The apparatus adapted to render automatic the various movements of the carriage 4 of the lathe is shown in the right-hand portion of Fig. 1. Said apparatus comprises a compressed air servo-motor for the control of the to-and-fro movements of the carriage 4 and thus of the tool 6, relatively to the work 3 which is being operated upon. In the particular case, said servo-motor comprises two cylinders 7 in each of which slides a piston 8. A pipe 9 supplies compressed air to the distributor valve 10 fixed to the frame of the machine tool, of which the valve 11 permits of sending said compressed air either into a pipe 12 supplying the left-hand side of each cylinder 7, or into a pipe 13 supplying the right-hand side of each cylinder 7. Each piston 8 drives a rod 14 and the two rods are themselves connected together at their two ends by crossbars 15. One of these two crossbars 15 is connected to rods 16 extending towards the rear of the carriage 4 of the lathe 1. The cylinders 7 are, as will be understood, secured relatively to the framework of the lathe 1. Said apparatus also comprises a regulating cylinder 17 in which slides a piston 18 secured to the end of a rod 19 secured to the crossbar 15 located at the right of Fig. 1. The interior of said cylinder 17 is placed into communication with a tank for oil or other liquids adapted to regularise the movements of the pistons 8 of the servo-motors 7 by adjusting the escape of oil at the end of the cylinder 17, either from one side or the other of the piston 18. A regulating device of this character will not be described herein, in view of the fact that it is of a known type, already described, particularly in Swiss specification No. 314,403. It, however, suffices to indicate that the pipe placing the right-hand cylinder 17 into communication with the oil reservoir is of large cross-section so as to permit of a rapid rearward return of the carriage 4 of the lathe. The passage placing the left-hand portion of the cylinder 17 into communication with the oil tank is controlled by a valve 20 of which the control has been shown in a very diagrammatic manner in Fig. 1, by a lever 21, of which one end acts on the said valve 20, whilst the other end forming a feeler finger 22 follows a cam 23 partaking of the movement of the rods 14 and, for this reason, of the carriage 4 of the lathe. It is thus possible to impart to this cam 23 all the desired shapes capable, for example, of producing a rapid forward movement of the carriage 4 and of the tool 6 in the direction of the work 3 to be machined, this forward movement being only slowed down, through the medium of the cam 23, at the moment at which the tool 6 reaches the immediate proximity of the part 3 to be machined.

The portion of the apparatus which is of interest is precisely that which allows of the control of the various successive phases of advance and return of the tool 6 to and from the part 3 to be machined, particularly during a drilling operation. The portion of the apparatus controlling these different movements of feed and return comprise a guide 24 secured to the carriage 4 and therefore, for this reason, is relatively fixed with respect to a slide 25. Thus, it will be understood that the guide 24 moves with the tool carrying turret. In said guide 24 is mounted the aforesaid slide 25 carrying an offset finger 26 which provides one of the control stops of the distributor 10. Said finger 26 constitutes a first stop and is formed as a part of L-shaped plate 27 whose longitudinal position may be adjusted on the slide 25 by two screws 28 engaging with a slot 29 provided in the plate. An arm 30 is hinged at 31 on one of the sides of the guide 24. Said arm 30 carries a pin 32 forming the second control stop of the distributor 10. Said arm 30 also carries an arm lifting pawl 33 at its central portion which is adapted to co-operate with an abutment 34 secured to the framework of the lathe. Said arm 30 also carries at the end opposite pivot 31 a second or pendant arm retaining pawl 35 pivoted at 36 to the right-hand end of the arm 30. The nose 37 of said pawl 35 is adapted to co-operate with a pin 38 secured to the depending leg 24ª of the guide 24. Said pawl 35 is also provided with a right angularly offset lug 39 (see Figs. 4 and 6) adapted to co-operate with a stop 40 of which the position can be adjusted and fixed relatively to the framework of the lathe by means of a screw 41 with a milled head 42, secured axially to the framework of the lathe. The two positions of operation of the valve stem 11 of the distributor 10 are determined, on the one hand, by a first distributor pawl 43, and, on the other hand, by a second distributor pawl 44, said two pawls 43 and 44 being hinged at 45 and 46 respectively, to the body of the distributor. A spring 47 is hooked at one of its ends to the left-hand portion of the valve stem 11, its other end being hooked to a stationary part of the framework of the lathe. A spring 49, of greater force than that of the spring 47, is hooked to the right-hand portion of the valve stem 11 by one of its ends. The other end of said spring 49 is secured to two guide discs 50 and 51 capable of sliding axially in a cylinder 52 in which a spring 49 is located. Said discs 50 and 51 each carry a tappet 53, 54 respectively. The tappet 54 is adapted to co-operate with a stop 55 secured to the guide 24. As regards the tappet 53, this is adapted to co-operate with the right-hand end 56, in the form of a ramp provided on the arm 30.

The pin 32 is adapted to co-operate with the pawl 44 so as to produce the reversal of rearward travel into forward travel of the carriage 4. On the other hand, the stop finger 26 is adapted to co-operate with the pawl 43 for producing the reversal of forward movement into rearward movement of the carriage 4. The said offset finger 26 will be adjusted automatically at various points during the course of a drilling operation, particularly for limiting the active stroke of the tool 6 in the direction of the work 3 and to produce a series of successive retractile movements of the tool out of the part 3 to allow of the removal of cuttings. It is therefore necessary to produce a definite predetermined movement of said offset finger 26 during each to-and-fro movement of the carriage of the lathe, so as to progressively move the limit of advance of the tool 6 relatively to the work 3 which is being operated upon. For this purpose, the slide 25, carrying the offset finger 26, is provided with a rack 57 with which meshes a pinion 58 turning on a spindle 59 carried by the guide 24. The movement of rotation of said pinion 58 is adapted to be controlled by a ratchet lever 60 having attached thereto the upper half of a toothed ratchet, which engages with the complementary part of the ratchet device 61. A mechanism is provided for permitting the declutching of this ratchet device 61. Said mechanism comprises a push rod 71, capable of sliding vertically in a hole of the guide 24. The upper end of the push rod 71 is adapted to come into contact with a collar 72 which bars the upper teeth of the ratchet device 61. The lower end of said pusher 71 is in contact with one end of a lever 73, hinged at 74 below and transversely of the guide 24 and arm 30. The other end of said lever 73 co-operates with the arm 30 which produces the rocking of the lever 73 and the declutching of the device 61 when it is in the lower position shown in Figs. 2 to 6. This declutching of the device 61 is thus effected, as shown in Fig. 6, by the lifting of the upper teeth, secured to the collar 72, relatively to the lower teeth secured to the pinion 58. The device 61 is therefore only engaged and active when the arm 30 is in the position shown in Fig. 4. A spiral spring, not shown, is adapted continuously, to return the ratchet lever 60 against a stop 62, carried by the guide 24. Any angular movement of the ratchet lever 60 in a counter-clockwise movement relatively to Figs. 3 and 5, that is to say whilst the clutch device 61 is engaged, thus tends to cause the slide 25 to move towards the right relatively to the guide 24, this against the action of the spring 63 tending to return the slide 25 towards the left. The movements of the oscillating ratchet lever 60 are produced during each return movement rearwardly of the carriage 4 by ratchet lever 60 coming into contact with a pawl 64, pivotally mounted on a part 65 which is stationary relatively to the framework of the machine. Said pawl 64 tends to be returned continuously against a stop 66 by a spring, not shown. In order that each movement imparted to the slide 25 by the ratchet lever 60 may be correctly conserved, a ratchet locking detent 67, co-operating with a rack 68 secured to the slide 25, is provided. Said pawl 67 is hinged about an axis 69 which is stationary relatively to the guide 24 carrying the slide. It is to be observed that said pawl 67 may be disengaged from the detent strip 68 when it comes into contact with a stop 70 which is stationary relatively to the framework of the lathe. Said stop 70 is located in such a manner as to come into contact with the detent 67 when the carriage of the lathe approaches its retracted position which is spaced the greatest distance from the work 3 which is being operated upon. The operation of the apparatus above described with reference to the accompanying drawings is effected in the following manner:

In the normal position of rest, the carriage 4 is located in the rear position the furthest removed from the work 3 and this position corresponds with that shown in Figs. 2 and 3. In this position, the tappet 54, which has been moved by the stop 55 during the last movement of rearward return of the carriage 4, has tensioned the spring 49. The valve stem 11 is maintained in position by reason of the distributor pawl 44, which thus determines a supply of compressed air from the passage 9 to the left-hand portion of the cylinders of the servomotors 7, through the medium of the pipe 12.

When there is produced, either directly manually, or through the medium of a mechanism not shown, a disengagement of the pawl 44, the latter releases the valve stem 11 which is drawn towards the right by the spring 49, until the pawl 43 engages with the valve stem 11. In this position of the distributor 10, shown in Figs. 1 and 5, the left-hand portion of the cylinders of the servo-motors is set to exhaust, whilst the compressed air is conducted, through the medium of the pipe 13, into the right-hand portion of the cylinders of the said servo-motors 7. The pistons 8 are thus urged towards the left and produce the advance movement of the carriage 4. This advance movement may be accelerated at its start by reason of the regulating device 17 and 18 controlled by the cam 23 with which the feeler finger 22 cooperates. This feed movement is brought to a reduced speed when the corresponding tool 6 comes into proximity of the work 3 to be machined. During this first advance movement of the carriage 4 and consequently the guide 24 which is attached to it and the pawl 33, carried by the arm 30, comes into contact with the stop 34, whereby there is produced a lifting of the arm 30 by causing it to pass from the position shown in Fig. 2 into the position shown in Fig. 4, in which it will be seen that the pawl 35, by co-operating with the stop pin 38, ensures the maintenance of the arm 30 in the raised position.

As the slide 25 becomes located in the extreme left-hand position relatively to the guide 24, after the tool 6 has effected its operation, for example a drilling operation on the work 3 for a predetermined depth, the offset finger 26, previously adjusted by means of the screws 28, comes into contact with the right-hand pawl 43 of the distributor valve stem 11. The rocking of the pawl 43 releases the valve stem 11 which is drawn towards the left by the spring 47 until the left-hand distributor pawl 44 engages with the valve stem 11. There is thus produced a reverse of forward travel into rearward travel of the carriage 4. The stem 11 of the distributor 10 is then in the position shown in Fig. 3. During this return movement of the carriage 4 and guide 24, provided for effecting clearing, that is to say the elimination of shavings from the hole drilled by the drill 6, the ratchet lever 60 comes into contact with the pawl 64, which produces, through the medium of the ratchet device 61 and the pinion 58, a movement of the slide 25 equal to the length of a tooth on the detent strip 68.

The stop 32 is located on the arm 30, in such a manner as to come into contact with the distributor pawl 44 after the drill 6 has been withdrawn from the hole drilled in the part 3. As the spring 49 is tensioned (Figure 5) by the tappet 53 in contact with the shoe 56, and the distributor pawl 44 has released the valve stem 11, the latter is drawn towards the right by the spring 49 until the pawl 43 is engaged (see Fig. 5), a further advance movement is thus given to the carriage 4. However, as the stop finger 26 on the plate carried by slide 25 has been moved towards the right by an amount of one tooth of the detent strip 68, the drill 6 deepens the hole drilled in the work 3 to be machined by this same amount before the finger 26, by coming into contact with the pawl 43, produces a further return movement of the carriage for removing chips or borings cut by the drill 6. These forward and return movements of the carriage are continued whilst each time the limit of advance of the carriage 4 is moved slightly towards the left until the right angularly offset lug 39 of the pawl 35 comes into contact with the stop 40 of which the position has been previously adjusted and fixed according to the depth to be given to the hole drilled by the bit. Consequently, during the last forward movement of the carriage 4, the lug 39, by coming into contact with the stop 40 produces the disengagement of the nose 37 on pawl 35 from the stop 38, whereby the arm 30 is enabled to resume its lower position shown in Fig. 2. On reaching its lower position the guide carried arm 30 releases the ratchet device 61. On the other hand, during the return movement imparted to the carriage 4 by the last entry into contact of the finger 26 against the distributor pawl 43, the stop pin 32, being no longer in the path of the distributor pawl 44, passes beneath and no reversing movement is applied to the carriage 4. The parts of the apparatus thus resume the positions shown in Figs. 2 and 3. It is to be observed that when the carriage 4 reaches the end of its rearward movement, the upper free end of the detent 67, by coming into contact with the frame stop 70, disengages the detent strip 68, which allows return towards the left to the position of rest of the slide 25 under the action of the spring 63, the ratchet lever 60 being unable to oppose this movement in view of the fact that the ratchet device 61 is disengaged by the arm 30.

The apparatus is thus ready for effecting a new machining operation.

For simplifying the description of the apparatus, it has been assumed that this is provided with only a single cam 23 for the control of a single working operation such as for example a drilling operation. However, it will be understood that a cam of the type of cam 23 may be provided for the control of the forward and return movements of each of the tools carried by the turret 5. In this case, these various cams 23 may be located on a drum of the type of that described in Swiss specification No. 314,403 already referred to. The apparatus described has been assumed mounted on a turret-lathe. However, it will be understood that a similar apparatus may be applied equally well to another machine tool, for example a drilling machine.

In a modification, it will be understood that the various parts of the apparatus hereinbefore described may be reversed as regards the securing thereof to the machine tool. Thus the distributor 10 may be so arranged as to be movable as a unit with the tool supported by the machine tool, whilst the part 24 carrying the slide is secured to the framework of the machine.

I claim:

1. An attachment for rendering automatic the control of a machine tool wherein the tool is reciprocated relative to the work, said attachment, comprising, a carriage, a servo-motor for controlling the reciprocatory movement of the carriage relative to the work, and means for controlling the servo-motor to effect the forward and reverse operation of the tool holder relative to the work, said means including, distributor valve means in piped communication with the servo-motor to supply actuating fluid thereto, a stem in said distributor valve means, a guide mounted on the carriage to move therewith, a slide movable in said guide, a spring connecting said guide and slide, a rack on said slide, a pinion on the guide, ratchet clutch means for controlling the operation of said pinion, first and second pawl means carried by the distributor valve casing, a first stop on the slide for engaging the first pawl on the distributor valve casing, and a second stop carried by an arm pivoted to the guide for engaging the second pawl.

2. In a machine tool having a frame, a servo-motor on the frame, a carriage actuated by said servo-motor to reciprocate toward and from the work, a valve controlled regulating cylinder for said servo-motor, lever means for operating said valve and an attachment for rendering the carriage automatic in its movement to perform the desired service on the work and to effect relatively quick retractile movement to remove debris, said attachment including, a guide fixed to the carriage to move therewith relative to said frame, a distributor valve casing in piped relation to the servo-motor and having a slidable stem provided with spaced shoulders for cooperation with related first and second distributor pawls pivotally mounted on the distributor valve casing, a weak spring for biasing the stem in one direction, a stronger spring for biasing the stem in the other direction, spaced tappets connected with said stronger spring, a slide movable in the guide, a cam on the exposed face of the slide cooperating with lever means for controlling the valve regulating cylinder, a rack portion on an edge of the slide, a detent strip on the same face of the slide as the cam, a plate longitudinally adjustable on the slide and having an offset portion for engaging the first of said pawls on the distributor valve casing, an arm pivoted at one end to one side of the guide, an arm lifting pawl pivotally connected to the medial portion of the arm for engagement with a fixed part of the frame as the guide moves in a direction toward the work to lift the arm and to trail over said fixed part of the frame when the guide moves in a direction away from the work, a pin on the arm for operating the second of said distributor pawls on the distributor valve casing, a ramp at the free end of the arm for elevating the first of said tappets, a pin projecting laterally from an offset portion of the guide, a pendant pawl pivotally suspended from the arm adjacent the ramp and having a shoulder for engaging the pin on the guide to keep the lever lifted on the back stroke of the slide and permit its pawl to trail over the frame part which lifts it in its forward movement, a right angularly laterally offset lug on said pendant pawl, an abutment adjustable on the machine frame adapted to be engaged with said lug, a pinion engageable with said rack, a ratchet clutch connected to said pinion, means for rendering said ratchet clutch operative and inoperative relative to said pinion, and a locking detent pivoted on the frame for cooperation with said detent strip.

3. A construction according to claim 2, wherein the means for rendering said ratchet clutch operative and inoperative includes, a push rod slidable in the guide, and a lever disposed transversely below the guide and having one end engaged with the lower end of the push rod and its other end disposed below the arm pivoted to the side of the guide, whereby, when the lever drops the push rod is moved upwardly to disengage said ratchet clutch.

4. In a machine tool according to claim 2, wherein the spaced tappets are connected to the strong spring and are carried by discs slidable in a tubular guide, one of said tappets positioned to be controlled by said ramp, and the other of said tappets being controlled by the guide.

5. An attachment for rendering automatic the control of a machine tool including a frame whose drill is mounted on a carriage and must be withdrawn from the workpiece several times in the course of one operation, the limit of the operative stroke advancing progressively at each intermediate phase of operation, said attachment comprising a servo-motor for controlling the reciprocatory movement of the drill in relation to the workpiece, and means for reversing the operation of said servo-motor including a distributor having a stem and a first and second pawl intended to be actuated by two spaced stops carried by a guide mounted on the carriage and a slide shiftable in the guide to provide relative sliding parts, the first stop causing reversal of forward movement into backward movement and the second stop causing the opposite reversal, said apparatus comprising, a mechanism capable of causing a predetermined forward movement of the first stop at each back-and-forth movement, so as to progressively shift the limit of the tool's operative stroke with respect to the workpiece, the said mechanism including a lever mounted to oscillate in relation to the slide and acting on a pinion transmitting the movement of the lever to a rack on the slide carrying the said first stop, said lever being moved at each back-and-forth stroke of the carriage upon engaging an abutment carried by the frame of the machine.

6. An apparatus according to claim 5, wherein, the said guide and slide mounted on the carriage are subject to the action of a spring against whose action the said lever acts at the time of each impulse and a pinion for the rack and a ratchet clutch for the pinion and cooperating to assure maintenance of the said slide in a stable position between each impulse.

7. An apparatus according to claim 5, wherein, an adjustable abutment is mounted on the frame to determine the limit of the operative stroke of the tool with relation to the workpiece and the second stop is carried by an arm on the guide to cause reversal of forward movement to backward movement, said arm being capable of occupying two positions with relation to the guide on the tool carriage, and means for causing said two positions including two pawls, the first of which actuates said arm into a position for which the second stop is in inactive position at the time of the forward operative stroke of the tool carriage, the adjustable stop on the frame acting on the second of the two pawls to move the said second stop into inactive position after the last operative stroke of the tool carriage with relation to the workpiece.

8. An apparatus according to claim 5, wherein, the distributor includes a casing having a valve stem capable of occupying two positions, in one of which it controls the forward stroke of the tool carriage, and in the other of which it controls the withdrawal stroke, said distributor including two pawls pivoted on the distributor casing, each cooperating successively with the valve stem to maintain it in position against the force of two springs of unequal strength acting respectively on the extremities of the valve stem, tappet means controlled by the to-and fro movements of the tool carriage with respect to the workpiece causing said springs to act successively on the valve stem, the stronger spring being taut only during the backward stroke of the tool carriage to permit the valve stem to move to its position for controlling the advance stroke.

References Cited in the file of this patent

UNITED STATES PATENTS

| | | |
|---|---|---|
| 2,073,518 | Hirvonen | Mar. 9, 1937 |
| 2,183,297 | McKee et al. | Dec. 12, 1939 |
| 2,190,284 | Foshie | Feb. 13, 1940 |
| 2,324,727 | Shartle | July 20, 1943 |